United States Patent
Zheng et al.

(10) Patent No.: US 12,427,504 B2
(45) Date of Patent: Sep. 30, 2025

(54) LAYERED CATALYTIC ARTICLE AND METHOD OF MANUFACTURING THE CATALYTIC ARTICLE

(71) Applicant: BASF MOBILE EMISSIONS CATALYSTS LLC, Iselin, NJ (US)

(72) Inventors: Xiaolai Zheng, Iselin, NJ (US); Aleksei Vjunov, Iselin, NJ (US); Michel Deeba, East Brunswick, NJ (US); Shiang Sung, Iselin, NJ (US); Pascaline Tran, Iselin, NJ (US)

(73) Assignee: BASF MOBILE EMISSIONS CATALYSTS, LLC, Iselin, NJ (US)

( * ) Notice: Subject to any disclaimer, the term of this patent is extended or adjusted under 35 U.S.C. 154(b) by 866 days.

(21) Appl. No.: 17/595,335

(22) PCT Filed: Jun. 23, 2020

(86) PCT No.: PCT/US2020/039109
§ 371 (c)(1),
(2) Date: Nov. 15, 2021

(87) PCT Pub. No.: WO2020/263810
PCT Pub. Date: Dec. 30, 2020

(65) Prior Publication Data
US 2022/0203339 A1 Jun. 30, 2022

Related U.S. Application Data

(60) Provisional application No. 62/867,353, filed on Jun. 27, 2019.

(30) Foreign Application Priority Data

Jul. 17, 2019 (EP) .................................... 19186665

(51) Int. Cl.
*B01J 23/46* (2006.01)
*B01D 53/94* (2006.01)
(Continued)

(52) U.S. Cl.
CPC .......... *B01J 23/464* (2013.01); *B01D 53/945* (2013.01); *B01D 53/9454* (2013.01);
(Continued)

(58) Field of Classification Search
None
See application file for complete search history.

(56) References Cited

U.S. PATENT DOCUMENTS

2015/0266014 A1   9/2015   Xue et al.
2018/0169624 A1   6/2018   Chandler et al.

FOREIGN PATENT DOCUMENTS

GB   2 560 939 A   10/2018

OTHER PUBLICATIONS

International Search Report dated Oct. 22, 2020, PCT/US2020/039109.
(Continued)

*Primary Examiner* — Daniel Berns
(74) *Attorney, Agent, or Firm* — DLA Piper LLP (US)

(57) ABSTRACT

The presently claimed invention provides a layered catalytic article and an exhaust system. The catalytic article comprises a first layer comprising platinum, a first platinum group metal component other than platinum, a ceria-alumina composite, and an oxygen storage component; wherein platinum is supported on the ceria-alumina component; the platinum group metal component is selected from palladium, rhodium or a combination thereof and the platinum group metal component is supported on the oxygen storage component; a second layer comprising a second platinum group metal component; and a refractory alumina compo-
(Continued)

| Rh/ Al₂O₃, OSC |
|---|
| Pd/OSC, Pd/Al₂O₃ |
| Substrate |

| Rh/Al₂O₃, OSC |
|---|
| Pt/Pd/Al₂O₃, Pt/Pd/OSC |
| Substrate | nent, an oxygen storage component or a combination thereof; wherein the second platinum group component is selected from platinum, palladium, rhodium or a combination thereof; and a substrate, wherein the amount of platinum is 10 to 80 wt. %, based on the total weight of platinum, palladium and rhodium. The presently claimed invention also provides a process for the preparation of a layered catalytic article and use of the catalytic article and the exhaust system for purifying a gaseous exhaust stream comprising hydrocarbons, carbon monoxide, and nitrogen oxides.

27 Claims, 4 Drawing Sheets

(51) Int. Cl.
| | |
|---|---|
| *B01J 21/04* | (2006.01) |
| *B01J 23/02* | (2006.01) |
| *B01J 23/10* | (2006.01) |
| *B01J 23/44* | (2006.01) |
| *B01J 23/63* | (2006.01) |
| *B01J 35/00* | (2006.01) |
| *B01J 35/56* | (2024.01) |
| *B01J 37/03* | (2006.01) |
| *B01J 37/08* | (2006.01) |
| *F01N 3/10* | (2006.01) |
| *F01N 3/28* | (2006.01) |
| *F01N 13/00* | (2010.01) |

(52) U.S. Cl.
CPC .......... *B01D 53/9477* (2013.01); *B01J 21/04* (2013.01); *B01J 23/02* (2013.01); *B01J 23/10* (2013.01); *B01J 23/44* (2013.01); *B01J 35/19* (2024.01); *B01J 35/56* (2024.01); *B01J 37/038* (2013.01); *B01J 37/082* (2013.01); *F01N 3/101* (2013.01); *F01N 3/2803* (2013.01); *F01N 3/2839* (2013.01); *F01N 13/0093* (2014.06); *B01D 2255/1021* (2013.01); *B01D 2255/1023* (2013.01); *B01D 2255/1025* (2013.01); *B01D 2255/2042* (2013.01); *B01D 2255/2065* (2013.01); *B01D 2255/2092* (2013.01); *B01D 2255/9022* (2013.01); *B01D 2255/904* (2013.01); *B01D 2255/908* (2013.01); *F01N 2370/02* (2013.01)

(56) References Cited

OTHER PUBLICATIONS

European Search Report for EP Patent Application No. 19186665.6, Issued on Jan. 13, 2020, 3 pages.
Heck, et al., "The Preparation of Catalytic Materials: Carriers, Active Components and Monolithic Substrates", Catalytic Air Pollution Control: Commercial Technology, Second Edition, Jul. 24, 2002, pp. 18-19.

LAYERED CATALYTIC ARTICLE AND METHOD OF MANUFACTURING THE CATALYTIC ARTICLE

CROSS-REFERENCE TO RELATED APPLICATIONS

This application is a U.S. national stage entry application under 35 U.S.C. § 371 from International Application No. PCT/US2020/039109, filed on Jun. 23, 2020, which claims the benefit of priority to U.S. Provisional Patent Application No. 62/867,353, filed on Jun. 27, 2019, and to European Application No. 19186665.6, filed on Jul. 17, 2019, and the contents of each application is incorporated herein by reference in its entirety.

FIELD OF THE INVENTION

The presently claimed invention relates to a layered catalytic article useful for the treatment of automobile exhaust gases to reduce contaminants contained therein. Particularly, the presently claimed invention relates to the layered catalytic article, a method of preparing the catalytic article and its use as an emission control catalyst.

BACKGROUND OF THE INVENTION

Three-way conversion (TWC) catalysts (hereinafter interchangeably referred to as three-way conversion catalyst, three-way catalyst, TWC Catalyst, and TWC) have been utilized in the treatment of the exhaust gas streams from the internal combustion engines for over three decades. Generally, in order to treat or purify the exhaust gas containing pollutants such as hydrocarbons, nitrogen oxides, and carbon monoxide, catalytic converters containing a three-way conversion catalyst are used in the exhaust gas line of an internal combustion engine. The three-way conversion catalyst is typically known to oxidize unburnt hydrocarbons and carbon monoxide and reduce nitrogen oxides.

Typically, most of the commercially available TWC catalysts contain palladium as a major platinum group metal component which is used along with a lesser amount of rhodium. It is possible that a palladium supply shortage may arise in the market in upcoming years since a large amount of palladium is used for the fabrication of catalytic converters that help to reduce the exhaust gas pollutant amounts. Currently, palladium is substantially more expensive than platinum. At the same time, the platinum prices are expected to decrease due to decreasing demand of platinum. One of the reasons could be the decreasing production volumes of diesel-powered vehicles.

Accordingly, there is a need to replace a portion of palladium with platinum in the TWC catalyst in order to reduce the cost of the catalyst substantially. Platinum has been widely used in a diesel oxidation catalyst (DOC) and lean NOx traps (LNT) for emission control of diesel-fueled vehicles but its use in the gasoline-fueled vehicles is limited. The proposed approach of replacing the portion of palladium with platinum is complicated by the need to maintain or improve the desired efficacy of the catalyst, which may not be possible by simply replacing a portion of palladium with platinum. One of the reasons is that platinum is prone to sintering under high temperature aging conditions with an extended duration. It is found that platinum particles deposited on a conventional refractory alumina can grow into submicron size via a well-established Oswald ripening mechanism.

Accordingly, the objective of the presently claimed invention is to provide a stable platinum, palladium and rhodium based TWC catalyst in which about 10-80 wt. % of platinum, based on the total PGM loading is utilized, and which provides an improved or equal catalyst performance compared to a commercial palladium-rhodium based TWC catalyst, described by comparison of the individual CO, HC and $NO_x$ conversion levels as well as the corresponding cumulative tail pipe emissions, as required for vehicle certifications by regulatory bodies of the majority of jurisdictions.

SUMMARY OF THE DISCLOSURE

In accordance with the presently claimed invention, there is provided a layered catalytic article comprising:
  a) a first layer comprising platinum, a first platinum group metal component other than platinum, a ceria-alumina component, and an oxygen storage component; wherein platinum is supported on the ceria-alumina component; the first platinum group metal component is selected from palladium, rhodium, or a combination thereof; and the first platinum group metal component is supported on the oxygen storage component,
  b) a second layer comprising a second platinum group metal component; and a refractory alumina component, an oxygen storage component or a combination thereof; wherein the second platinum group is selected from platinum, palladium, rhodium and a combination; and
  c) a substrate,
  wherein the amount of platinum is 10 to 80 wt. %, based on the total weight of platinum, palladium and rhodium.

In one embodiment, the amount of platinum is 20 to 80 wt. %, based on the total weight of platinum, palladium and rhodium; and the amount of palladium and rhodium is 20 to 80 wt. %, based on the total weight of platinum, palladium and rhodium.

In accordance with another aspect of the presently claimed invention, there is provided a process for the preparation of a layered catalytic article according to the presently claimed invention In accordance with another aspect of the presently claimed invention, there is provided a method of treating a gaseous exhaust stream comprising hydrocarbons, carbon monoxide, and nitrogen oxides, the method comprises contacting the exhaust stream with the layered catalytic article or the exhaust system according to the presently claimed invention.

In accordance with another aspect of the presently claimed invention, there is provided a method of reducing hydrocarbons, carbon monoxide, and nitrogen oxides levels in a gaseous exhaust stream, the method comprises contacting the gaseous exhaust stream with the layered catalytic article or the exhaust system according to the presently claimed invention to reduce the levels of hydrocarbons, carbon monoxide, and nitrogen oxides in the exhaust gas.

In accordance with another aspect of the presently claimed invention, there is provided the use of the catalytic article or the exhaust system according to the presently claimed invention for purifying a gaseous exhaust stream comprising hydrocarbons, carbon monoxide, and nitrogen oxides.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only and should not be construed as limiting the invention. The above and other features of the presently claimed invention, their nature, and various advantages will become more apparent upon consideration of the following detailed description, taken in conjunction with the accompanying drawings:

DETAILED DESCRIPTION

Figure 1A:
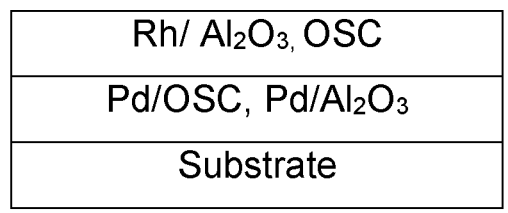
FIG. 1A and FIG. 1B are schematic representations of the reference catalytic article designs.

The presently claimed invention now will be described more fully hereafter. The presently claimed invention may be embodied in many different forms and should not be construed as limited to the embodiments set forth herein; rather, these embodiments are provided so that this presently claimed invention will be thorough and complete, and will fully convey the scope of the invention to those skilled in the art. No language in the specification should be construed as indicating any non-claimed element as essential to the practice of the disclosed materials and methods.

The use of the terms "a", "an", "the", and similar referents in the context of describing the materials and methods discussed herein (especially in the context of the following claims) are to be construed to cover both the singular and the plural, unless otherwise indicated herein or clearly contradicted by context.

The term "about" used throughout this specification is used to describe and account for small fluctuations. For example, the term "about" refers to less than or equal to ±5%, such as less than or equal to ±2%, less than or equal to ±1%, less than or equal to ±0.5%, less than or equal to ±0.2%, less than or equal to ±0.1% or less than or equal to ±0.05%. All numeric values herein are modified by the term "about," whether or not explicitly indicated. A value modified by the term "about" of course includes the specific value. For instance, "about 5.0" must include 5.0.

All methods described herein can be performed in any suitable order unless otherwise indicated herein or otherwise clearly contradicted by context. The use of any and all examples, or exemplary language (e.g., "such as") provided herein, is intended merely to better illustrate the materials and methods and does not pose a limitation on the scope unless otherwise claimed. The present invention provides a tri-metallic layered catalytic article comprising three platinum group metals (PGM) in which a high amount of platinum can be used to substitute palladium substantially.

The platinum group metal (PGM) refers to any component that includes a PGM (Ru, Rh, Os, Ir, Pd, Pt and/or Au). For example, the PGM may be in a metallic form, with zero valence, or the PGM may be in an oxide form. Reference to "PGM component" allows for the presence of the PGM in any valence state. The terms "platinum (Pt) component," "rhodium (Rh) component," "palladium (Pd) component," "iridium (Ir) component," "ruthenium (Ru) component," and the like refer to the respective platinum group metal compound, complex, or the like which, upon calcination or use of the catalyst, decomposes or otherwise converts to a catalytically active form, usually the metal or the metal oxide.

The term "catalyst" or "catalytic article" or "catalyst article" refers to a component in which a substrate is coated with catalyst composition which is used to promote a desired reaction. In one embodiment, the catalytic article is a layered catalytic article. The term layered catalytic article refers to a catalytic article in which a substrate is coated with a PGM composition(s) in a layered fashion. These composition(s) may be referred to as washcoat(s).

The term "$NO_x$" refers to nitrogen oxide compounds, such as NO and/or $NO_2$.

The presently claimed invention addresses the problem of replacing a portion of palladium with platinum in the Pd/Rh conventional TWC catalyst and provides a catalyst comprising Pt, Pd and Rh along with an optimized support for stabilizing platinum. The issue of platinum sintering when doped on an alumina may be resolved at a certain level by using ceria as a support. Platinum may form a monolayer, oftentimes partially or fully oxidized on the ceria surface due to strong $PtO—CeO_2$ interaction. However, bulk ceria itself can undergo sintering upon high temperature aging.

Accordingly, the present invention addresses the aforesaid issue and provides a ceria-alumina composite as a platinum support for a TWC catalyst. Platinum is selectively deposited on the ceria-alumina composite which provides optimal three-way catalytic performance and prevents platinum from migrating to other catalytic components. The PGM components are allocated in a layered washcoat architecture for optimal utilization of platinum for three-way conversion catalysis after high temperature aging on a gasoline engine.

The presently claimed invention provides a layered catalytic article comprising a) a first layer comprising platinum, a first platinum group metal component other than platinum, a ceria-alumina composite, and an oxygen storage component; wherein platinum is supported on the ceria-alumina component; the first platinum group metal component is selected from palladium, rhodium or a combination thereof; and the first platinum group metal is supported on the oxygen storage component, b) a second layer comprising a second platinum group metal component; and a refractory alumina component, an oxygen storage component or a combination thereof; wherein the second platinum group metal component is selected from platinum, palladium, rhodium and a combination thereof, wherein the amount of platinum is 10 to 80 wt. %, based on the total weight of platinum, palladium and rhodium, and c) substrate. In one embodiment, about 2 to 20 wt. % of palladium can optionally be deposited on ceria-alumina together with platinum. In one embodiment, the amount of platinum in the first layer is 50 to 100 wt. %, based on the total weight of platinum in the catalytic article.

In one embodiment, the layered catalytic article of the presently claimed invention is used as a close-coupled or underfloor catalyst.

In one embodiment, the first layer is deposited on the substrate as a bottom coat and the platinum group metal component comprises palladium; and the second layer is deposited on the first layer as a top coat and the platinum group metal component comprises rhodium.

In one exemplary embodiment, the layered catalytic article comprises a first layer which is deposited on the substrate as a bottom layer, the first layer comprises platinum supported on the ceria-alumina component, and palladium supported on each of the ceria-alumina and oxygen storage component; and a second layer which is deposited on the first layer as a top layer, the second layer comprises rhodium supported on the oxygen storage component and optionally palladium supported on the oxygen storage component, wherein the amount of platinum is 10 to 80 wt. %, based on the total weight of platinum, palladium and rhodium.

In one embodiment, palladium and platinum are supported on a single support selected from a refractory alumina component, a ceria-alumina component and an oxygen storage component. In another embodiment, palladium and platinum are supported on a separate support selected from a refractory alumina component, a ceria-alumina component and an oxygen storage component.

In one embodiment, the second layer is deposited on the substrate as a bottom coat and the platinum group metal component comprises palladium; and the first layer is deposited on the second layer as a top coat and the platinum group metal component comprises rhodium.

In one exemplary embodiment, the layered catalytic article comprises a second layer which is deposited on the substrate as a bottom layer, the second layer comprises palladium supported on the oxygen storage component, refractory alumina component or a combination thereof; and a first layer which is deposited on the second layer as a top layer, the first layer comprises rhodium supported on the oxygen storage component and platinum supported on the ceria-alumina component, wherein the amount of platinum is 10 to 80 wt. %, based on the total weight of platinum, palladium and rhodium.

In one embodiment, the layered catalytic article comprises a) a first layer (bottom coat) comprising platinum supported on the ceria-alumina component; and palladium supported on the oxygen storage component and a ceria-alumina component, b) a second layer (top coat) comprising rhodium supported on the oxygen storage component, and c) a substrate, wherein the amount of platinum is 10 to 80 wt. %, based on the total weight of platinum, palladium and rhodium.

In one embodiment, the layered catalytic article comprises a) a first layer (bottom coat) comprising platinum supported on the ceria-alumina component; and palladium supported on the oxygen storage component, and ceria-alumina component, b) a second layer (top coat) comprising rhodium supported on the oxygen storage component, and palladium supported on the oxygen storage component, and c) a substrate, wherein the amount of platinum is 10 to 80 wt. %, based on the total weight of platinum, palladium and rhodium.

In one embodiment, the layered catalytic article comprises a) a first layer (bottom coat) comprising palladium supported on the refractory alumina component, oxygen storage component or a combination thereof, b) a second layer (top coat) comprising platinum supported on the ceria-alumina component; and rhodium supported on the oxygen storage component, and c) a substrate, wherein the amount of platinum is 10 to 80 wt. %, based on the total weight of platinum, palladium and rhodium.

In one embodiment, the layered catalytic article comprises a) a first layer (bottom coat) comprising platinum supported on the ceria-alumina component; and palladium supported on the oxygen storage component and ceria-alumina component, b) a second layer (top coat) comprising palladium supported on the oxygen storage component and rhodium supported on the ceria-alumina component, refractory alumina component, oxygen storage component or any combination thereof, and c) a substrate, wherein the amount of platinum is 10 to 80 wt. %, based on the total weight of platinum, palladium and rhodium.

In one embodiment, the layered catalytic article comprises a) a first layer (bottom coat) comprising palladium and rhodium supported on the ceria-alumina component, refractory alumina component, oxygen storage component or any combination thereof, b) a second layer (top coat) comprising platinum supported on the ceria-alumina component; and rhodium supported on the oxygen storage component, and c) a substrate, wherein the amount of platinum is 10 to 80 wt. %, based on the total weight of platinum, palladium and rhodium.

In one exemplary embodiment, the bottom coat/layer comprises platinum supported on the ceria-alumina component and optionally, palladium supported on the ceria-alumina component and/or oxygen storage component; and the top coat comprises rhodium supported on a stabilized refractory alumina and palladium supported on an oxygen storage component. In another exemplary embodiment, the bottom coat comprises palladium supported on a stabilized refractory alumina and oxygen storage component; and the top coat/layer comprises rhodium supported on the oxygen storage component and platinum supported on the ceria-alumina component.

In one embodiment, the correlation coefficient between platinum and aluminium in the first layer is greater than 70% measured by EPMA line scan analysis.

As used herein, the term "EPMA" refers to "electron probe microanalysis" or "electron microprobe analysis". EPMA provides a line scan technique which analyse concentrations of individual elements in probed spots. Pearson's product moment correlation coefficient, sometimes referred to as Pearson's correlation or simply as the correlation coefficient, is used to measure the linear relationship between two variables as described below:

Let $\sigma_x$ and $\sigma_y$ be the standard deviations of two random variables X and Y respectively, and the Pearson's product moment correlation coefficient between the two variables is:

$$\rho_{x,y} = \frac{cov(X, Y)}{\sigma_x \sigma_y} = \frac{E((X - E(X))(Y - E(Y)))}{\sigma_x \sigma_y}$$

where E(.) denotes the expected value of the variable, and cov(.) means covariance.

In one embodiment, the ceria-alumina component comprises ceria-alumina, ceria-yttrium-alumina, ceria-silica-alumina, ceria-tin-alumina, ceria-manganese alumina, ceria-iron-alumina, ceria-nickel-alumina, ceria-iridium-alumina, ceria-ruthenium-alumina, ceria-indium-alumina, or ceria-titania. In one embodiment, the ceria content of the ceria-alumina component is in the range of 1.0 to 75.0 wt. %, based on the total weight the ceria-alumina component. In one embodiment, the ceria content of the ceria-alumina component is in the range of 5.0 to 50.0 wt. %, based on the total weight the ceria-alumina component. In one embodiment, the ceria content of the ceria-alumina component is in the range of 5.0 to 30.0 wt. %, based on the total weight the ceria-alumina component.

In one embodiment, the amount of platinum in the first layer is in the range of 0.02 to 4.0 wt. %, based on the total weight of the washcoat of the catalytic article. In one embodiment, the amount of palladium in the catalytic article is in the range of 0.02 to 4.0 wt. %, based on the total weight of the washcoat of the catalytic article. In one embodiment, the amount of rhodium in the catalytic article is in the range of 0.02 to 4.0 wt. %, based on the total weight of the washcoat of the catalytic article.

In one embodiment, the oxygen storage compound is a material that changes its valence by storing and releasing oxygen depending on the partial pressure of oxygen in the operating environment. For gasoline vehicles, the environment in the exhaust gas treatment system is constantly changing, perturbating around a lambda value equivalent to 1. The lambda value is defined by the ratio of oxygen content to the combination of CO and HC contents, and is measured by a lambda sensor. In the modern gasoline vehicle setup, two lambda sensors are used. One is located in front of the TWC catalyst, and one behind. When the lambda value, detected by the sensor in front of the TWC, is greater than 1, it indicates that the engine is operating with more oxygen needed for combustion of CO and HC in the cylinder chamber, which is good for the reduction of CO/HC emissions. When the lambda value, detected by the sensor in front of the TWC, is less than 1, it means that the engine is operating with an insufficient amount of oxygen needed for combustion of CO and HC in the cylinder chamber, which is good for the reduction of NOx emissions. To balance the overall CO/HC/NOx emissions, modern vehicles are operating under a tight lambda perturbation of around 1. However, to accommodate the acceleration and stop-go scenarios encountered in real world driving conditions, which will cause a wide perturbation in lambda values, resulting in poor catalyst performance, an oxygen storage compound is needed to minimize the lambda perturbation during such extreme driving conditions. While ceria is well-known for its good oxygen storage capability, it has a poor thermal stability. Modern vehicles, in providing the customer with long duration warranties, need a catalyst with good long-lasting durability. Hence, a high temperature aging durability (>950° C.) for the modern TWC catalysts is required from the OEMs. Toward this end, zirconium-stabilized ceria was introduced as a means to meet these requirements.

"Oxygen storage component, that exhibits an oxygen storage capability and often is an entity that has multi-valent oxidation states and can actively release oxygen under an oxygen depleted environment and be re-oxidized (restore oxygen) under an oxygen enriched environment. Examples of suitable oxygen storage components include ceria and praseodymia and combinations thereof.

In some embodiments, the OSC is a mixed metal oxide composite, comprising ceria and/or praseodymia in combination with other metal oxides. Certain metal oxides that can be included in such mixed metal oxides are: zirconium oxide ($ZrO_2$), titania ($TiO_2$), yttria ($Y_2O_3$), neodymia ($Nd_2O_3$), lanthana ($La_2O_3$), or mixtures thereof. For example, a "ceria-zirconia composite" means a composite comprising ceria and zirconia. In some embodiments, the ceria content in a mixed metal oxide composite ranges from about 25% to about 95%, by weight of the total mixed metal oxide composite.

In some embodiments, the total ceria or praseodymia content in the OSC ranges from about 5% to about 99.9%, preferably from about 5% to about 70%, even more preferably from about 10% to about 50% by weight of the total mixed metal oxide composite.

In one embodiment, the oxygen storage component comprises ceria, zirconia, and a rare earth metal oxide selected from lanthana, yttria, neodymia, praseodimia, gadolinia, or any combination thereof. In one embodiment, the oxygen storage component comprises ceria in an amount of 5.0 to 50.0 wt. %, based on the total weight of the oxygen storage component.

In one embodiment, the refractory alumina component comprises alumina, and optionally, a dopant selected from lanthana, ceria, titania, zirconia, hafnia, magnesia, calcia, strontia, baria, or any combinations thereof.

In one embodiment, the second layer is essentially free of platinum. As used herein the term "essentially free of platinum" refers to no external addition of platinum in the second layer, however it may optionally be present as a fractional amount <0.001 wt. %.

In one embodiment, the first layer and/or the second layer further comprises barium oxide, strontium oxide, lanthanum oxide or any combination thereof.

In one embodiment, platinum is thermally or chemically fixed on the ceria-alumina component.

In one embodiment, the substrate utilized to make the catalytic article is selected from a ceramic substrate, a metal substrate, a ceramic foam substrate, a polymer foam substrate and a woven fibre substrate. In one embodiment, the substrate is a ceramic substrate.

In one exemplary embodiment, the layered catalytic article comprises a first layer which is deposited on the substrate as a bottom layer, the first layer comprises platinum supported on the ceria-alumina component, and palladium supported on each of the ceria-alumina and oxygen storage component; and a second layer which is deposited on the first layer as a top layer, the second layer comprises rhodium supported on the oxygen storage component and optionally palladium supported on the oxygen storage component, wherein the amount of platinum is 20 to 50 wt. %, based on the total weight of platinum, palladium and rhodium, wherein the ceria content of the ceria-alumina component is in the range of 5.0 to 30.0 wt. %, based on the total weight the ceria-alumina component, wherein the oxygen storage component comprises ceria in an amount of 5.0 to 50.0 wt. %, based on the total weight of the oxygen storage component, wherein the second layer is essentially free of platinum.

In one exemplary embodiment, the layered catalytic article comprises a second layer which is deposited on the substrate as a bottom layer, the second layer comprises palladium supported on the oxygen storage component, refractory alumina component or a combination thereof; and a first layer which is deposited on the second layer as a top layer, the first layer comprises rhodium supported on the oxygen storage component and platinum supported on the ceria-alumina component, wherein the amount of platinum is 20 to 50 wt. %, based on the total weight of platinum, palladium and rhodium, wherein the ceria content of the ceria-alumina component is in the range of 5.0 to 30.0 wt. %, based on the total weight the ceria-alumina component, wherein the oxygen storage component comprises ceria in an amount of 5.0 to 50.0 wt. %, based on the total weight of the oxygen storage component, wherein the second layer is essentially free of platinum.

In one exemplary embodiment, the layered catalytic article comprises a first layer which is deposited on the substrate as a bottom layer, the first layer comprises platinum supported on the ceria-alumina component, and palladium supported on each of the ceria-alumina and oxygen storage component; and a second layer which is deposited on the first layer as a top layer, the second layer comprises rhodium supported on the oxygen storage component and optionally palladium supported on the oxygen storage component, wherein the amount of platinum is 20 to 50 wt. %, based on the total weight of platinum, palladium and rhodium, wherein the ceria content of the ceria-alumina component is in the range of 5.0 to 30.0 wt. %, based on the total weight the ceria-alumina component, wherein the amount of platinum in the first layer is in the range of 0.02 to 4.0 wt. %, based on the total weight of the washcoat of the catalytic article, wherein the amount of palladium in the catalytic article is in the range of 0.02 to 4.0 wt. %, based on the total weight of the washcoat of the catalytic article, wherein the amount of rhodium in the catalytic article is in the range of 0.02 to 4.0 wt. %, based on the total weight of the washcoat of the catalytic article, wherein the second layer is essentially free of platinum.

As used herein, the term "substrate" refers to the monolithic material onto which the catalyst composition is placed, typically in the form of a washcoat containing a plurality of particles containing a catalytic composition thereon.

Reference to "monolithic substrate" or "honeycomb substrate" means a unitary structure that is homogeneous and continuous from inlet to outlet.

As used herein, the term "washcoat" has its usual meaning in the art of a thin, adherent coating of a catalytic or other material applied to a substrate material, such as a honeycomb-type carrier member, which is sufficiently porous to permit the passage of the gas stream being treated. A washcoat is formed by preparing a slurry containing a certain solid content (e.g., 15-60% by weight) of particles in a liquid vehicle, which is then coated onto a substrate and dried to provide a washcoat layer.

As used herein and as described in Heck, Ronald and Farrauto, Robert, Catalytic Air Pollution Control, New York: Wiley-Interscience, 2002, pp. 18-19, a washcoat layer includes a compositionally distinct layer of material disposed on the surface of a monolithic substrate or an underlying washcoat layer. In one embodiment, a substrate contains one or more washcoat layers, and each washcoat layer is different in some way (e.g., may differ in physical properties thereof such as, for example particle size or crystallite phase) and/or may differ in the chemical catalytic functions.

The catalytic article may be "fresh" meaning it is new and has not been exposed to any heat or thermal stress for a prolonged period of time. "Fresh" may also mean that the catalyst was recently prepared and has not been exposed to any exhaust gases or elevated temperatures. Likewise, an "aged" catalyst article is not fresh and has been exposed to exhaust gases and elevated temperatures (i.e., greater than 500° C.) for a prolonged period of time (i.e., greater than 3 hours).

According to one embodiment, the substrate of the catalytic article of the presently claimed invention may be constructed of any material typically used for preparing automotive catalysts and typically comprises a ceramic or a metal monolithic honeycomb structure. In one embodiment, the substrate is a ceramic substrate, metal substrate, ceramic foam substrate, polymer foam substrate or a woven fiber substrate.

The substrate typically provides a plurality of wall surfaces upon which washcoats comprising the catalyst compositions described herein above are applied and adhered, thereby acting as a carrier for the catalyst compositions.

Exemplary metallic substrates include heat resistant metals and metal alloys such as titanium and stainless steel as well as other alloys in which iron is a substantial or major component. Such alloys may contain one or more nickel, chromium, and/or aluminium, and the total amount of these metals may advantageously comprise at least 15 wt. % of the alloy. e.g. 10-25 wt. % of chromium, 3-8%) of aluminium, and up to 20 wt. % of nickel. The alloys may also contain small or trace amounts of one or more metals such as manganese, copper, vanadium, titanium and the like. The surface of the metal substrate may be oxidized at high temperature, e.g., 1000° C. and higher, to form an oxide layer on the surface of the substrate, improving the corrosion resistance of the alloy and facilitating adhesion of the washcoat layer to the metal surface.

Ceramic materials used to construct the substrate may include any suitable refractory material, e.g., cordierite, mullite, cordierite-alumina, silicon nitride, zircon mullite, spodumene, alumina-silica magnesia, zircon silicate, sillimanite, magnesium silicates, zircon, petalite, alumina, aluminosilicates and the like.

Any suitable substrate may be employed, such as a monolithic flow-through substrate having a plurality of fine, parallel gas flow passages extending from an inlet to an outlet face of the substrate such that passages are open to fluid flow. The passages, which are essentially straight paths from the inlet to the outlet, are defined by walls on which the catalytic material is coated as a washcoat so that the gases flowing through the passages contact the catalytic material. The flow passages of the monolithic substrate are thin-walled channels which are of any suitable cross-sectional shape, such as trapezoidal, rectangular, square, sinusoidal, hexagonal, oval, circular, and the like. Such structures contain from about 60 to about 1200 or more gas inlet openings (i.e., "cells") per square inch of cross section (cpsi), more usually from about 300 to 900 cpsi. The wall thickness of flow-through substrates can vary, with a typical range being between 0.002 and 0.1 inches. A representative commercially-available flow-through substrate is a cordierite substrate having 400 cpsi and a wall thickness of 6 mil, or 600 cpsi and a wall thickness of 4 mil. However, it will be understood that the invention is not limited to a particular substrate type, material, or geometry. In alternative embodiments, the substrate may be a wall-flow substrate, wherein each passage is blocked at one end of the substrate body with a non-porous plug, with alternate passages blocked at opposite end-faces. This requires that gas flow through the porous walls of the wall-flow substrate to reach the exit. Such monolithic substrates may contain up to about 700 or more cpsi, such as about 100 to 400 cpsi and more typically about 200 to about 300 cpsi. The cross-sectional shape of the cells can vary as described above. Wall-flow substrates typically have a wall thickness between 0.002 and 0.1 inches. A representative commercially available wall-flow substrate is constructed from a porous cordierite, an example of which has 200 cpsi and 10 mil wall thickness or 300 cpsi with 8 mil wall thickness, and wall porosity between 45-65%. Other ceramic materials such as aluminum-titanate, silicon carbide and silicon nitride are also used as wall-flow filter substrates.

However, it will be understood that the invention is not limited to a particular substrate type, material, or geometry. Note that where the substrate is a wall-flow substrate, the catalyst composition can permeate into the pore structure of the porous walls (i.e., partially or fully occluding the pore openings) in addition to being disposed on the surface of the walls. In one embodiment, the substrate has a flow through ceramic honeycomb structure, a wall-flow ceramic honeycomb structure, or a metal honeycomb structure.

Figure 3A:
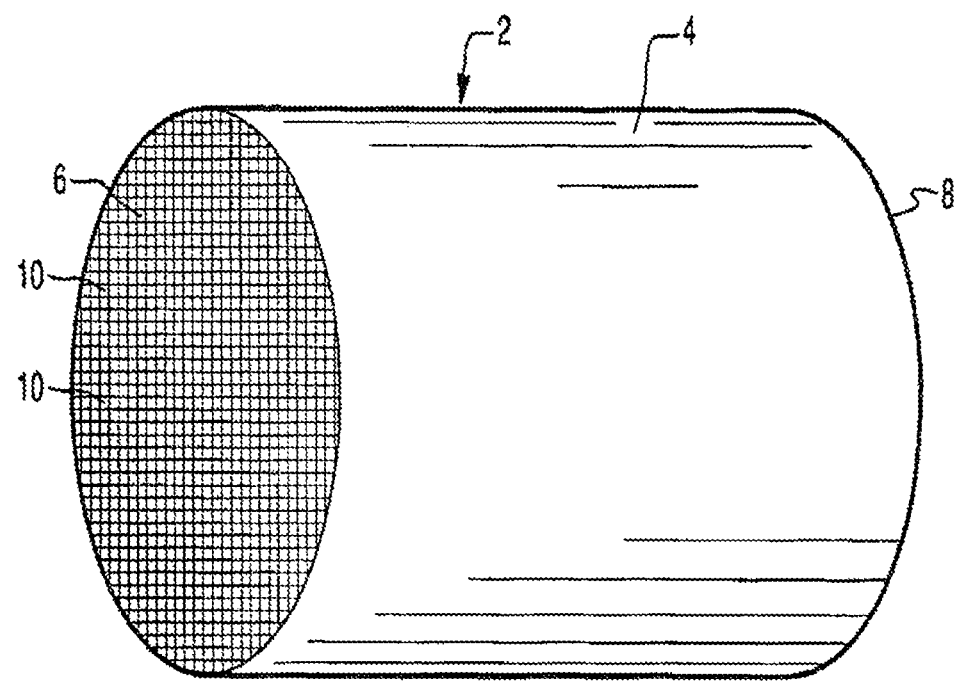
FIG. 3A is a perspective view of a honeycomb-type substrate carrier which may comprise the catalyst composition in accordance with one embodiment of the presently claimed invention.
Figure 3B:
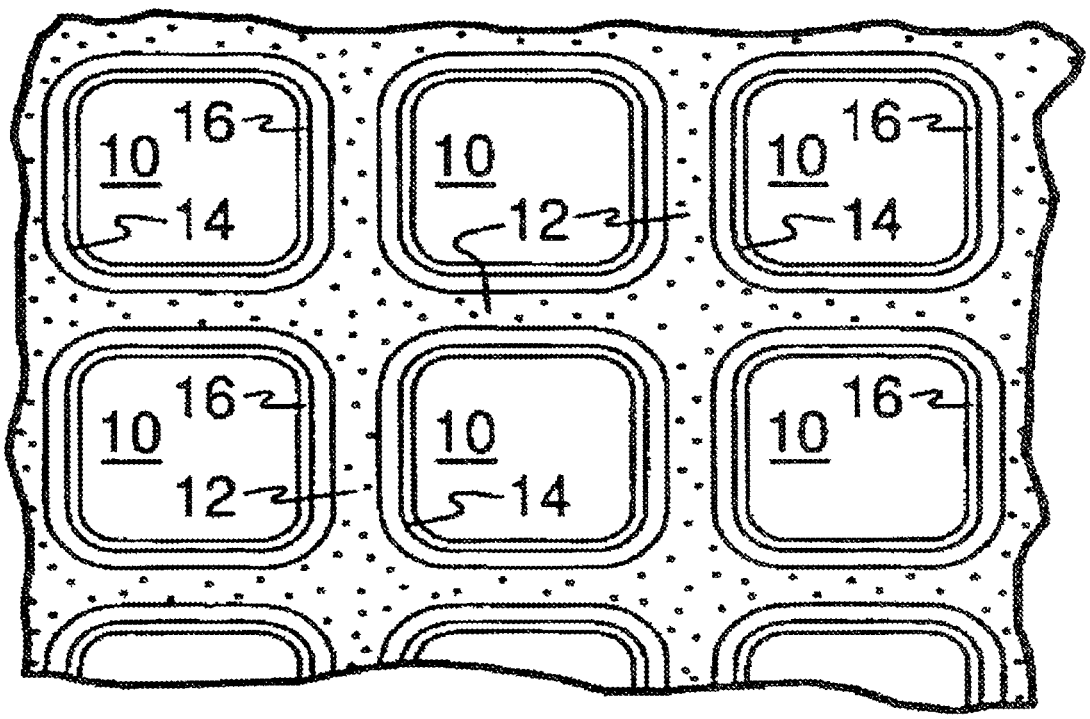
FIG. 3B is a partial cross-section view enlarged relative to FIG. 3A and taken along a plane parallel to the end faces of the substrate carrier of FIG. 3A, which shows an enlarged view of a plurality of the gas flow passages shown in FIG. 3A.

FIGS. 3A and 3B illustrate an exemplary substrate 2 in the form of a flow-through substrate coated with washcoat compositions as described herein. Referring to FIG. 3A, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 3B, flow passages 10 are formed by walls 12 and extend through substrate 2 from upstream end face 6 to downstream end face 8, the passages 10 being unobstructed so as to permit the flow of a fluid, e.g., a gas stream, longitudinally through substrate 2 via gas flow passages 10 thereof. As more easily seen in FIG. 3B, walls 12 are so dimensioned and configured that gas flow passages 10 have a substantially regular polygonal shape. As shown, the washcoat compositions can be applied in multiple, distinct layers if desired. In the illustrated embodiment, the washcoats consist of a discrete first washcoat layer 14 adhered to the walls 12 of the substrate member and a second discrete washcoat layer 16 coated over the first washcoat layer 14. In one embodiment, the presently claimed invention is also practiced with two or more (e.g., 3, or 4) washcoat layers and is not limited to the illustrated two-layer embodiment.

Figure 4:
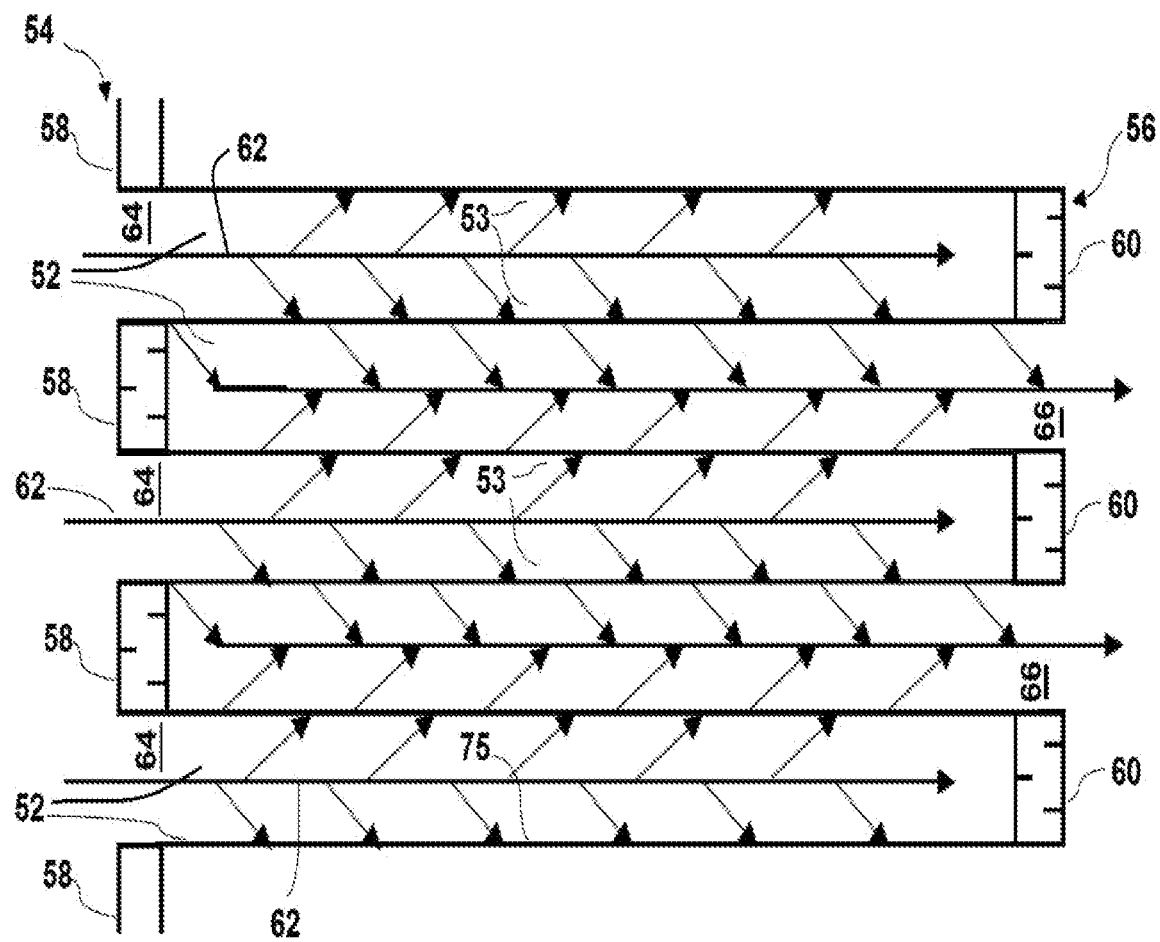
FIG. 4 is a cutaway view of a section enlarged relative to FIG. 3A, wherein the honeycomb-type substrate in FIG. 3A represents a wall flow filter substrate monolith.

FIG. 4 illustrates an exemplary substrate 2 in the form of a wall flow filter substrate coated with a washcoat composition as described herein. As seen in FIG. 4, the exemplary substrate 2 has a plurality of passages 52. The passages are tubularly enclosed by the internal walls 53 of the filter substrate. The substrate has an inlet end 54 and an outlet end 56. Alternate passages are plugged at the inlet end with inlet plugs 58 and at the outlet end with outlet plugs 60 to form opposing checkerboard patterns at the inlet 54 and outlet 56. A gas stream 62 enters through the unplugged channel inlet 64, is stopped by outlet plug 60 and diffuses through channel walls 53 (which are porous) to the outlet side 66. The gas cannot pass back to the inlet side of walls because of inlet plugs 58. The porous wall flow filter used in this invention is catalysed in that the wall of said element has thereon or contained therein one or more catalytic materials. Catalytic materials may be present on the inlet side of the element wall alone, the outlet side alone, both the inlet and outlet sides, or the wall itself may consist all, or in part, of the catalytic material. This invention includes the use of one or more layers of catalytic material on the inlet and/or outlet walls of the element.

In accordance with another aspect of the presently claimed invention, the presently claimed invention provides a process for preparing the layered catalytic article. In one embodiment, the process comprises preparing a first layer (bottom coat) slurry; depositing the bottom first layer slurry on a substrate to obtain a first layer (bottom coat); preparing a second layer (top coat) slurry; and depositing the second layer (top coat) slurry on the bottom layer/coat to obtain a top layer/coat followed by calcination at a temperature ranging from 400 to 700° C., wherein the step of preparing the bottom coat slurry or top coat slurry comprises a technique selected from incipient wetness impregnation, incipient wetness co-impregnation, and post-addition. In one embodiment, the bottom coat slurry comprises platinum, a first platinum group metal component other than platinum, a ceria-alumina composite, and an oxygen storage component, wherein platinum is supported on the ceria-alumina component; wherein the first platinum group metal component is selected from palladium rhodium or a combination thereof; and the first platinum group metal component is supported on an oxygen storage component, and the top coat slurry comprises a second platinum group metal component; and a refractory alumina component, an oxygen storage component or a combination thereof, wherein the second platinum group metal component is selected from platinum, palladium, rhodium or a combination thereof. In another embodiment, the bottom coat slurry comprises a second platinum group metal component selected from platinum, palladium, rhodium and a combination thereof supported on a refractory alumina component, an oxygen storage component or any combination thereof, and the top coat slurry comprises platinum supported on a ceria-alumina component; and a first platinum group metal component selected from palladium, rhodium or a combination thereof supported on an oxygen storage component.

In one embodiment, the process involves a pre-step of thermal or chemical fixing of platinum and/or palladium on a support. The thermal fixing involves deposition of the platinum and/or palladium onto a support, e.g. via incipient wetness impregnation method, followed by the thermal calcination of the resulting platinum/support mixture. As an example, the mixture is calcined for 1-3 hours at 400-700° C. with a ramp rate of 1-25° C./min. The chemical fixing involves deposition of platinum and/or palladium onto a support followed by a fixation using an additional reagent to chemically transform platinum.

Incipient wetness impregnation techniques, also called capillary impregnation or dry impregnation are commonly used for the synthesis of heterogeneous materials, i.e., catalysts. Typically, an active metal precursor is dissolved in an aqueous or organic solution and then the metal-containing solution is added to a catalyst support containing the same pore volume as the volume of the solution that was added. Capillary action draws the solution into the pores of the support. Solution added in excess of the support pore volume causes the solution transport to change from a capillary action process to a diffusion process, which is much slower. The catalyst is dried and calcined to remove the volatile components within the solution, depositing the metal on the surface of the catalyst support. The concentration profile of the impregnated material depends on the mass transfer conditions within the pores during impregnation and drying. Multiple active metal precursors, after appropriate dilution, can be co-impregnated onto a catalyst support. Alternatively, an active metal precursor is introduced to a slurry via post-addition under agitation during the process of a slurry preparation.

The support particles are typically dry enough to absorb substantially all of the solution to form a moist solid. Aqueous solutions of water-soluble compounds or complexes of the active metal are typically utilized, such as rhodium chloride, rhodium nitrate, rhodium acetate, or combinations thereof where rhodium is the active metal and palladium nitrate, palladium tetra amine, palladium acetate, or combinations thereof where palladium is the active metal. Following treatment of the support particles with the active metal solution, the particles are dried, such as by heat treating the particles at elevated temperature (e.g., 100-150° C.) for a period of time (e.g., 1-3 hours), and then calcined to convert the active metal to a more catalytically active form. An exemplary calcination process involves heat treatment in air at a temperature of about 400-550° C. for 10 min to 3 hours. The above process can be repeated as needed to reach the desired level of loading of the active metal by means of impregnation.

The above-noted catalyst compositions are typically prepared in the form of catalyst particles as noted above. These catalyst particles are mixed with water to form a slurry for purposes of coating a catalyst substrate, such as a honeycomb-type substrate. In addition to the catalyst particles, the slurry may optionally contain a binder in the form of alumina, silica, zirconium acetate, zirconia, or zirconium hydroxide, associative thickeners, and/or surfactants (including anionic, cationic, non-ionic or amphoteric surfactants). Other exemplary binders include boehmite, gamma-alumina, or delta/theta alumina, as well as silica sol. When present, the binder is typically used in an amount of about 1.0-5.0 wt. % of the total washcoat loading. Addition of acidic or basic species to the slurry is carried out to adjust the pH accordingly. For example, in some embodiments, the pH of the slurry is adjusted by the addition of ammonium hydroxide, aqueous nitric acid, or acetic acid. A typical pH range for the slurry is about 3 to 12.

The slurry can be milled to reduce the particle size and enhance particle mixing. The milling is accomplished in a ball mill, continuous mill, or other similar equipment, and the solids content of the slurry may be, e.g., about 20-60 wt. %, more particularly about 20-40 wt. %. In one embodiment, the post-milling slurry is characterized by a $D_{90}$ particle size of about 3 to about 40 microns, preferably 10 to about 30 microns, more preferably about 10 to about 15 microns. The $D_{90}$ is determined using a dedicated particle size analyzer. The equipment employed in this example uses laser diffraction to measure particle sizes in small volume slurry. The $D_{90}$, typically with units of microns, means 90% of the particles by number have a diameter less than that value.

The slurry is coated on the catalyst substrate using any washcoat technique known in the art. In one embodiment, the catalyst substrate is dipped one or more times in the slurry or otherwise coated with the slurry. Thereafter, the coated substrate is dried at an elevated temperature (e.g., 100-150° C.) for a period (e.g., 10 min-3 hours) and then calcined by heating, e.g., at 400-700° C., typically for about 10 minutes to about 3 hours. Following drying and calcining, the final washcoat coating layer is viewed as essentially solvent-free. After calcining, the catalyst loading obtained by the above described washcoat technique can be determined through calculation of the difference in coated and uncoated weights of the substrate. As will be apparent to those of skill in the art, the catalyst loading can be modified by altering the slurry rheology. In addition, the coating/drying/calcining process to generate a washcoat can be repeated as needed to build the coating to the desired loading level or thickness, meaning more than one washcoat may be applied.

In certain embodiments, the coated substrate is aged, by subjecting the coated substrate to heat treatment. In one embodiment, aging is done at a temperature of about 850° C. to about 1050° C. in an environment of 10 vol. % water in an alternating hydrocarbon/air feed for 50-75 hours. Aged catalyst articles are thus provided in certain embodiments. In certain embodiments, particularly effective materials comprise metal oxide-based supports (including, but not limited to substantially 100% ceria supports) that maintain a high percentage (e.g., about 95-100%) of their pore volumes upon aging (e.g., at about 850° C. to about 1050° C., 10 vol. % water in an alternating hydrocarbon/air feed, 50-75 hours aging).

In accordance with another aspect of the presently claimed invention, there is provided an exhaust system (also referred as exhaust gas treatment system) for internal combustion engines. The exhaust system comprises the layered catalytic article according to the presently claimed invention. In one embodiment, the exhaust system comprises a platinum group metal based three-way conversion (TWC) catalytic article and the layered catalytic article according to the presently claimed invention, wherein the platinum group metal based three-way conversion (TWC) catalytic article is positioned downstream from an internal combustion engine and the layered catalytic article is positioned downstream in fluid communication with the platinum group metal based three-way conversion (TWC) catalytic article. In one embodiment, the exhaust system comprises a platinum group metal based three-way conversion (TWC) catalytic article and the layered catalytic article according to the presently claimed invention, wherein the layered catalytic article is positioned downstream from an internal combustion engine and the platinum group metal based three-way conversion (TWC) catalytic article is positioned downstream in fluid communication with the three-way conversion (TWC) catalytic article.

As used herein, the term "stream" broadly refers to any combination of flowing gas that may contain solid or liquid particulate matter.

As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine.

In accordance with still another aspect of the presently claimed invention, there is provided a method of treating a gaseous exhaust stream comprising hydrocarbons, carbon monoxide, and nitrogen oxides, the method comprises contacting the exhaust stream with the layered catalytic article or the exhaust system according to the presently claimed invention. The terms "exhaust stream", "engine exhaust stream", "exhaust gas stream", and the like refer to any combination of flowing engine effluent gas that may also contain solid or liquid particulate matter. The stream comprises gaseous components and is, for example, exhaust of a lean burn engine, which may contain certain non-gaseous components such as liquid droplets, solid particulates and the like. An exhaust stream of a lean burn engine typically comprises combustion products, products of incomplete combustion, oxides of nitrogen, combustible and/or carbonaceous particulate matter (soot) and un-reacted oxygen and/or nitrogen. Such terms refer as well as to the effluent downstream of one or more other catalyst system components as described herein.

In accordance with still another aspect of the presently claimed invention, there is provided a method of reducing hydrocarbons, carbon monoxide, and nitrogen oxides levels in a gaseous exhaust stream, the method comprises contacting the gaseous exhaust stream with the layered catalytic article or the exhaust system according to the presently claimed invention to reduce the levels of hydrocarbons, carbon monoxide, and nitrogen oxides in the exhaust gas.

In accordance with still another aspect, there is provided use of the layered catalytic article or the exhaust system according to the presently claimed invention for purifying a gaseous exhaust stream comprising hydrocarbons, carbon monoxide, and nitrogen oxides. In some embodiments, the catalytic article converts at least about 60%, or at least about 70%, or at least about 75%, or at least about 80%, or at least about 90%, or at least about 95% of the amount of carbon monoxide, hydrocarbons and nitrous oxides present in the exhaust gas stream prior to contact with the catalytic article. In some embodiment, the catalytic article converts hydrocarbons to carbon dioxide and water.

In some embodiments, the catalytic article converts at least about 60%, or at least about 70%, or at least about 75%, or at least about 80%, or at least about 90%, or at least about 95% of the amount of hydrocarbons present in the exhaust gas stream prior to contact with the catalytic article. In some embodiment, the catalytic article converts carbon monoxide to carbon dioxide. In some embodiment, the catalytic article converts nitrogen oxides to nitrogen.

In some embodiments, the catalytic article converts at least about 60%, or at least about 70%, or at least about 75%, or at least about 80%, or at least about 90%, or at least about 95% of the amount of nitrogen oxides present in the exhaust gas stream prior to contact with the catalytic article. In some embodiment, the catalytic article converts at least about 50%, or at least about 60%, or at least about 70%, or at least about 80%, or at least about 90%, or at least about 95% of the total amount of hydrocarbons, carbon dioxide, and nitrogen oxides combined present in the exhaust gas stream prior to contact with the catalytic article.

EXAMPLES

Aspects of the presently claimed invention are more fully illustrated by the following examples, which are set forth to illustrate certain aspects of the present invention and are not to be construed as limiting thereof.

Examples 1A-H: Preparation of Various Powder Catalysts with 2 wt. % Pt/Pd (Pt/Pd=2/1) on Different Support Materials The compositions of support materials are listed in Table 1. 1.33 wt. % Pt and 0.67 wt. % Pd were deposited sequentially onto the supports by the technique of the incipient wetness impregnation, using a platinum-amine complex and palladium nitrate as the PGM precursors. The impregnated wet powders were dried at 120° C. and then calcined at 550° C. for 2 hours in air.

TABLE 1

Compositions of powder support materials for examples 1A-H

| Example | $Al_2O_3$, wt. % | $CeO_2$, wt. % | $ZrO_2$, wt. % | $La_2O_3$, wt. % | $Y_2O_3$, wt. % |
|---|---|---|---|---|---|
| 1A | 96 | | | 4 | |
| 1B | | | 90 | 10 | |
| 1C | | 40 | 50 | 5 | 5 |
| 1D | 90 | 10 | | | |
| 1E | 80 | 20 | | | |
| 1F | 70 | 30 | | | |
| 1G | 50 | 50 | | | |
| 1H | 30 | 70 | | | |

Example 2: Aging and Testing of Catalysts of the Examples 1A-H

The Pt/Pd deposited powder catalysts of examples 1A-H were individually dispersed in deionized water to give a solid percentage of approximately 30%. The obtained slurries were milled and then dried while being stirred. The dried slurries were calcined at 550° C. for 1 hour. The resulting powdered catalysts were crushed and sieved to collect particles of 250-500 μm size for testing on a high throughput reactor.

Aging was carried out at 980° C. for 5 hours under cyclic lean/rich conditions in the presence of 10% steam. The lean/rich aging cycle included 5 minutes of air, 5 minutes of $N_2$, 5 minutes of 4% $H_2$ balanced with $N_2$, and 5 minutes of $N_2$. Such a cycle was repeated till the desired aging duration was reached.

The catalytic performance was evaluated on a high throughput reactor at $\lambda$=1.000+/−0.025 with an oscillating feed of one second lean gas and one second rich gas. Lean gas at $\lambda$=1.025: 0.7% CO, 0.22% $H_2$, 1.8% $O_2$, 1500 ppm$C_1$ $C_3H_6$, 750 ppm$C_1$ $C_3H_{18}$, 750 ppm$C_1$ iso-$C_4H_{10}$, 1500 ppm $NO_x$ 14% $CO_2$, 10% $H_2O$, and balance $N_2$. Rich gas at $\lambda$=0.975: 2.33% CO, 0.77% $H_2$, 0.7% $O_2$, 1500 ppm$C_1$ $C_3H_6$, 750 ppm$C_1$ $C_3H_{18}$, 750 ppm$C_1$ iso-$C_4H_{10}$, 1500 ppm NO, 14% $CO_2$, 10% $H_2O$, and balance $N_2$. The sample amount is 100 mg for each liner at a flow rate of 70 L/h. The catalytic conversions were measured at constant temperatures from 250-550° C. at 25° C. intervals.

Figure 2:
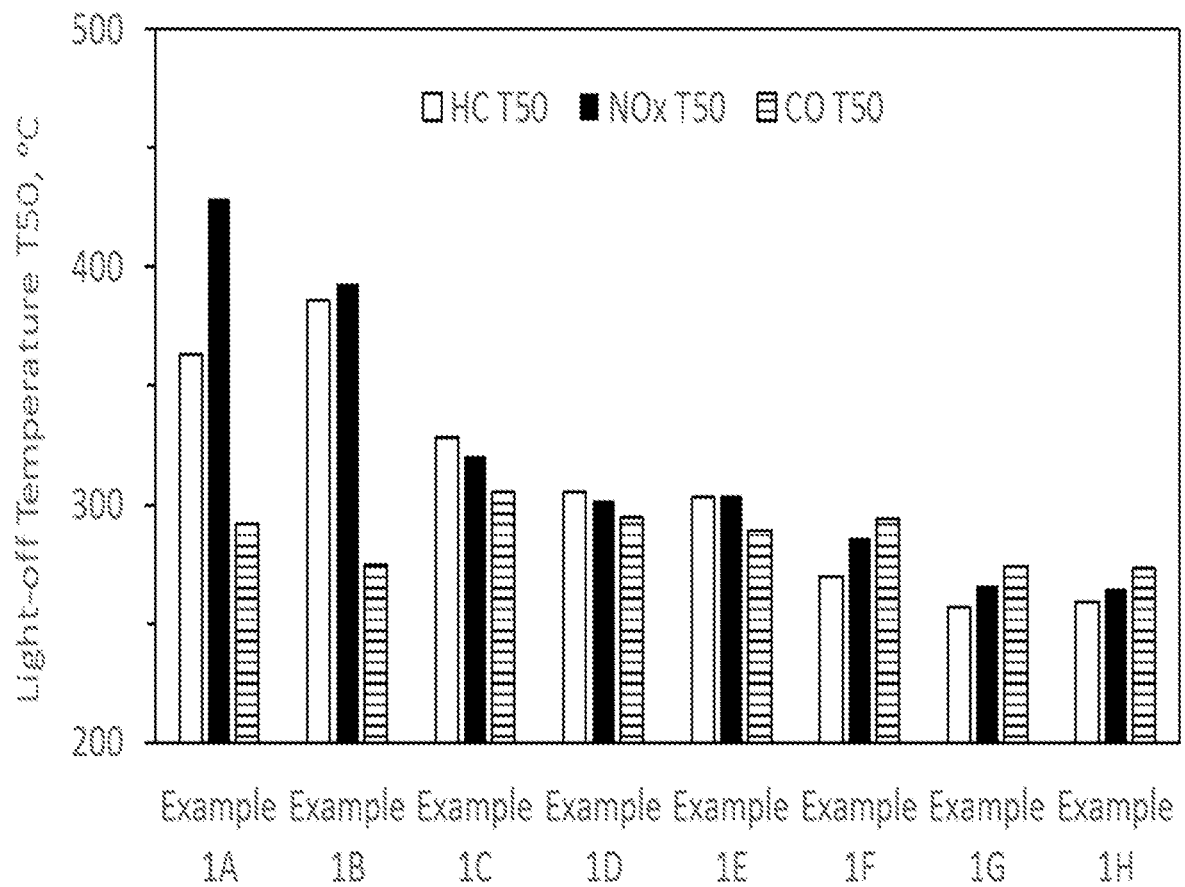
FIG. 2 illustrates comparative light-off temperatures of the various powder catalysts.

The HC, NOx and CO Light-off temperatures ($T_{50}$) of Examples 1A-H are plotted in FIG. 2. 1A-C are samples of 2 wt. % Pt/Pd deposited on conventional supports, including a $La_2O_3$-stabilized $Al_2O_3$, a $La_2O_3$-stabilized $ZrO_2$, and a $La_2O_3/Y_2O_3$-stabilized $CeO_2$—$ZrO_2$, respectively. 1D-H are samples of 2 wt. % Pt/Pd deposited on $CeO_2$-$Al_2O_3$ composites with varying $CeO_2$ to $Al_2O_3$ ratios. It was found that examples 1D-H with the $CeO_2$-$Al_2O_3$ supports exhibited substantially lower HC and NOx light-off temperatures compared to Examples 1A-C with the conventional supports. The better light-off activities of Examples 1D-H are presumably attributed to the desired Pt—Ce interactions which provide a higher Pt dispersion on the surface.

Example 3: Preparation of a Reference Pd/Rh Catalytic Article with a PGM Loading of 80 g/Ft³ (Pt/Pd/Rh=0/76/4)

A two-layer washcoat architecture was coated onto a cylindrical monolith cordierite substrate having dimensions of 4.66" in diameter and 3.58" in length, a cell density of 600 cpsi, and a wall thickness of 3.5 mils. Detailed process is provided below:

Preparation of a bottom coat: 38 g/ft³ of Pd (50 wt. % of the total Pd) in the form of palladium nitrate was impregnated onto a refractory alumina, and 38 g/ft³ of Pd (50 wt. % of the total Pd) in the form of palladium nitrate was impregnated onto a stabilized ceria-zirconia composite with approximately 40 wt. % ceria. A slurry containing about 35.2 wt. % of the refractory $Al_2O_3$, 49.6 wt. % of the stabilized ceria-zirconia composite, barium acetate to yield 11.6 wt. % of BaO, zirconium acetate to yield 1.9 wt. % of $ZrO_2$, and 1.7 wt. % of Pd was coated onto a substrate. The washcoat loading of the bottom coat was about 2.59 g/in³ after calcination at 550° C. for 1 hour in air.

Preparation of a top coat: 4 g/ft³ of Rh (100 wt. % of the total Rh) in the form of rhodium nitrate was impregnated onto a refractory alumina. A slurry mixture containing about 84.8 wt. % of the refractory $Al_2O_3$, 15.0 wt. % of a ceria-zirconia composite with approximately 50 wt. % ceria, and 0.23 wt. % of Rh was coated over the bottom coat. The washcoat loading of the top coat was about 1.00 g/in³ after calcination at 550° C. for 1 hour in air. The reference Pd/Rh catalytic article is illustrated in FIG. 1A.

Example 4: Preparation of a Pt/Pd/Rh Catalytic Article (Out of Scope) with a PGM Loading of 80 g/Ft³ (Pt/Pd/Rh=38/38/4)

A catalytic article was prepared by using the same washcoat materials and process as example 3, except that the bottom coat comprised 38 g/ft³ Pt and 38 g/ft³ Pd. Detailed process is provided below:

Preparation of a bottom coat: 19 g/ft³ of Pt (50 wt. % of the total Pt) in the form of a platinum-amine complex and 19 g/ft³ of Pd (50 wt. % of the total Pd) in the form of palladium nitrate were impregnated onto a refractory alumina. 19 g/ft³ of Pt (50 wt. % of the total Pt) in the form of a platinum-amine complex and 19 g/ft³ of Pd (50 wt. % of the total Pd) in the form of palladium nitrate were impregnated onto a stabilized ceria-zirconia composite with approximately 40 wt. % ceria. A slurry containing about 35.2 wt. % of the refractory $Al_2O_3$, 49.6 wt. % of the stabilized ceria-zirconia composite, barium acetate to yield 11.6 wt. % of BaO, zirconium acetate to yield 1.9 wt. % of $ZrO_2$, 0.85 wt. % of Pt, and 0.85 wt. % of Pd was coated onto a substrate. The washcoat loading of the bottom coat was about 2.59 g/in³ after calcination at 550° C. for 1 hour in air.

Figure 1B:
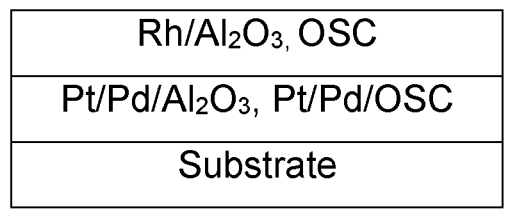
Figure 1C:
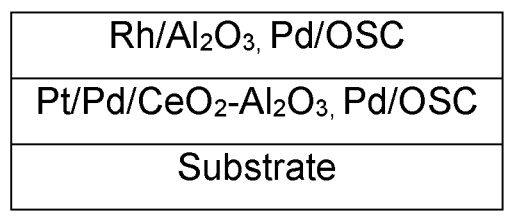
FIG. 1C and FIG. 1D are schematic representations of the catalytic article designs in exemplary configurations according to some embodiments of the presently claimed invention.

Preparation of a top coat: 4 g/ft³ of Rh (100 wt. % of the total Rh) in the form of rhodium nitrate was impregnated onto a refractory alumina. A slurry mixture containing about 84.8 wt. % of the refractory $Al_2O_3$, 15.0 wt. % of a ceria-zirconia composite with approximately 50 wt. % ceria, and 0.23 wt. % of Rh was coated over the bottom coat. The washcoat loading of the top coat was about 1.00 g/in³ after calcination at 550° C. for 1 hour in air. The reference Pt/Pd/Rh catalytic article is illustrated in FIG. 1B.

Example 5: Preparation of Pt/Pd/Rh Catalytic Article with a PGM Loading of 80 g/Ft³ (Pt/Pd/Rh=38/38/4) and with Pt Deposited on a Ceria-Alumina Composite in the Bottom Coat A two-layer washcoat architecture was coated onto a cylindrical monolith cordierite substrate having dimensions of 4.66" in diameter and 3.58" in length, a cell density of 600 cpsi, and a wall thickness of 3.5 mils. Detailed process is provided below:

Preparation of a bottom coat (the first layer): 38 g/ft³ of Pt (100 wt. % of the total Pt) in the form of a platinum-amine complex and 3.8 g/ft³ of Pd (10 wt. % of the total Pd) in the form of palladium nitrate were sequentially impregnated onto a refractory ceria-alumina composite with approximately 10 wt. % ceria. The Pt/Pd-impregnated $CeO_2$-$Al_2O_3$ composite was calcined at 550° C. for 2 hours. 22.9 g/ft³ of Pd (60 wt. % of the total Pd) in the form of palladium nitrate was impregnated onto a stabilized ceria-zirconia composite with approximately 40 wt. % ceria. A slurry containing about 40.2 wt. % of the refractory $CeO_2$-$Al_2O_3$ composite, 50.3 wt. % of the stabilized ceria-zirconia composite, barium acetate to yield 4.0 wt. % of BaO, zirconium acetate to yield 2.4 wt. % of $ZrO_2$, a colloidal alumina dispersion to yield 1.6 wt. % of $Al_2O_3$, 0.88 wt. % of Pt, and 0.62 wt. % of Pd was coated onto a substrate. The washcoat loading of the bottom coat was about 2.49 g/in³ after calcination at 550° C. for 1 hour in air.

Preparation of a top coat (the second layer): 4 g/ft³ of Rh (100 wt. % of the total Rh) in the form of rhodium nitrate was impregnated onto a refractory alumina. 11.4 g/ft³ of Pd (30 wt. % of the total Pd) in the form of palladium nitrate was impregnated onto a stabilized ceria-zirconia composite with approximately 10 wt. % ceria. A slurry mixture containing about 38.5 wt. % of the refractory $Al_2O_3$, 53.9 wt. % of the stabilized ceria-zirconia composite, barium acetate to yield 3.8 wt. % of BaO, zirconium acetate to yield 1.5 wt. % of $ZrO_2$, a colloidal alumina dispersion to yield 1.5 wt. % of $Al_2O_3$, 0.51 wt. % of Pd, 0.18 wt. % of Rh was coated over the bottom coat. The washcoat loading of the top coat was about 1.30 g/in³ after calcination at 550° C. for 1 hour in air. The invention Pt/Pd/Rh catalytic article is illustrated in FIG. 10.

Example 6: Preparation of a Pt/Pd/Rh Catalytic Article with a PGM Loading of 80 g/Ft³ (Pt/Pd/Rh=38/38/4) and with Pt Deposited on a Ceria-Alumina Composite in the Top Coat A two-layer washcoat architecture was coated onto a cylindrical monolith cordierite substrate having dimensions of 4.66" in diameter and 3.58" in length, a cell density of 600 cpsi, and a wall thickness of 3.5 mils. Detailed process is provided below:

Preparation of a bottom coat (the second layer): 9.5 g/ft³ of Pd (25 wt. % of the total Pd) in the form of palladium nitrate was impregnated onto a refractory alumina composite, and 28.5 g/ft³ of Pd (75 wt. % of the total Pd) in the form of palladium nitrate was impregnated onto a stabilized ceria-zirconia composite with approximately 40 wt. % ceria. A slurry containing about 28.1 wt. % of the refractory $Al_2O_3$, 58.6 wt. % of the stabilized ceria-zirconia composite, barium acetate to yield 9.4 wt. % of BaO, zirconium acetate to yield 1.9 wt. % of $ZrO_2$, a colloidal alumina dispersion to yield 1.0 wt. % of $Al_2O_3$, and 1.0 wt. % of Pd was coated onto a substrate. The washcoat loading of the bottom coat was about 2.13 g/in³ after calcination at 550° C. for 1 hour in air.

Figure 1D:
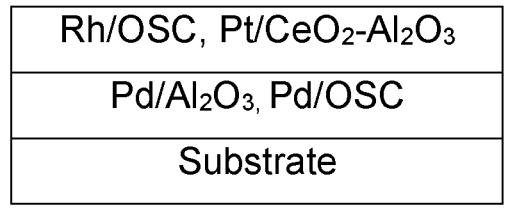

Preparation of a top coat (the first layer): 4 g/ft³ of Rh (100 wt. % of the total Rh) in the form of rhodium nitrate was impregnated onto a ceria-zirconia composite with approximately 10 wt. % ceria. 38 g/ft³ of Pt (100 wt. % of the total Pt) in the form of a platinum-amine complex was impregnated onto a stabilized ceria-alumina composite with approximately 10 wt. % ceria. The Pt-impregnated $CeO_2$-$Al_2O_3$ composite was calcined at 550° C. for 2 hours. A slurry mixture containing about 61.5 wt. % of the refractory $CeO_2$-$Al_2O_3$ composite, 30.8 wt. % of the stabilized ceria-zirconia composite, barium acetate to yield 1.2 wt. % of BaO, zirconium acetate to yield 2.5 wt. % of $ZrO_2$, a colloidal alumina dispersion to yield 2.5 wt. % of $Al_2O_3$, 1.4 wt. % of Pt, 0.14 wt. % of Rh was coated over the bottom coat. The washcoat loading of the top coat was about 1.62 g/in³ after calcination at 550° C. for 1 hour in air. The invention Pt/Pd/Rh catalytic article is illustrated in FIG. 1D.

Example 7: Preparation of a presently claimed Pt/Pd/Rh catalytic article with a PGM loading of 80 g/ft³ (Pt/Pd/Rh=38/38/4). A catalytic article was prepared by using the same washcoat materials and process as example 6, except that a refractory ceria-alumina composite with approximately 30% ceria was used as the support for Pt in the top coat.

Example 8: Preparation of a Pt/Pd/Rh catalytic article (out of scope) with a PGM loading of 80 g/ft³ (Pt/Pd/Rh=38/38/4). Example 8 was prepared by using the same washcoat materials and process as Example 6, except that a refractory ceria-free alumina was used as the support for Pt in the top coat.

Example 9: Aging and Testing of the Examples 3-8

The full-size monolith catalytic articles of examples 3-8 were mounted in steel converter cans and aged at a close-coupled position in an exhaust line of a gasoline engine being operated under fuel-cut aging cycles. The maximum bed temperature was 975° C. and the duration was 50 hours. The aged catalysts were tested on a SULEV-30 gasoline test vehicle of a 1.8 L engine displacement which was operated on US FTP-75 driving cycles following the certified procedures and tolerances.

The emissions of HC, NOx and CO on the FTP-75 tests are compiled in Table 2.

TABLE 2

HC, NOx and CO emissions on FTP-75 for Examples 3-8

| Example | PGM Loading g/ft$^3$ | Pt/Pd/Rh wt. ratio | HC mg/mile | NOx mg/mile | CO mg/mile |
|---|---|---|---|---|---|
| 3 | 80 | 0/76/4 | 67.5 | 33.4 | 1486 |
| 4 | 80 | 38/38/4 | 135 | 67.9 | 2552 |
| 5 | 80 | 38/38/4 | 58.0 | 21.9 | 1442 |
| 6 | 80 | 38/38/4 | 77.2 | 24.9 | 1611 |
| 7 | 80 | 38/38/4 | 74.0 | 22.8 | 1536 |
| 8 | 80 | 38/38/4 | 111 | 62.1 | 2253 |

The catalytic article of example 4 is found to be less effective compared to the reference catalytic article of example 3. Thus, the simple replacement of Pd with Pt afforded a low catalytic performance; i.e., HC, NOx and CO emissions were found to be higher in comparison with the reference catalytic article. The catalytic article of example 5 (which is a Pt/Pd/Rh based two-layer TWC with a Pt/Pd bottom coat and Pd/Rh top coat design, and with Pt deposited on a ceria-alumina composite in the bottom coat) showed comparatively higher catalytic performance than that of the reference catalytic article of example 3 in all emissions. The catalytic articles of examples 6 and 7 (which are Pt/Pd/Rh based two-layer catalytic articles with a Pd bottom coat and Pt/Rh top coat design, and with Pt deposited on a ceria-alumina composite in the top coat) showed lower or significantly lower NOx emissions compared to the reference catalytic articles of examples 3 or 4, respectively. The catalytic article of example 8 (which uses a ceria-free alumina instead of a ceria-alumina composite as a Pt support) significantly deteriorated the HC, NOx and CO performance. This finding strongly supported the Pt-ceria interactions as a key design feature to make an active Pt/Pd/Rh based TWC. The overall performance of the invention catalytic articles (Examples 5-7) is found to be improved over and/or comparable with the Pd/Rh based catalytic article for emission control applications. Further, these invention catalytic articles possess a cost benefit over the reference Pd/Rh based TWC due to a substantial use of Pt.

Reference throughout this specification to "one embodiment," "certain embodiments," "one or more embodiments" or "an embodiment" means that a particular feature, structure, material, or characteristic described in connection with the embodiment is included in at least one embodiment of the presently claimed invention. Thus, the appearances of the phrases such as "in one or more embodiments," "in certain embodiments," "in some embodiments," "in one embodiment," or "in an embodiment" in various places throughout this specification are not necessarily referring to the same embodiment of the presently claimed invention. Furthermore, the particular features, structures, materials, or characteristics may be combined in any suitable manner in one or more embodiments. All of the various embodiments, aspects, and options disclosed herein can be combined in all variations, regardless of whether such features or elements are expressly combined in a specific embodiment description herein. This presently claimed invention is intended to be read holistically such that any separable features or elements of the disclosed invention, in any of its various aspects and embodiments, should be viewed as intended to be combinable unless the context clearly dictates otherwise.

Although the embodiments disclosed herein have been described with reference to particular embodiments it is to be understood that these embodiments are merely illustrative of the principles and applications of the presently claimed invention. It will be apparent to those skilled in the art that various modifications and variations can be made to the methods and apparatus of the presently claimed invention without departing from the spirit and scope of the presently claimed invention. Thus, it is intended that the presently claimed invention include modifications and variations that are within the scope of the appended claims and their equivalents, and the above-described embodiments are presented for purposes of illustration and not of limitation. All patents and publications cited herein are incorporated by reference herein for the specific teachings thereof as noted, unless other statements of incorporation are specifically provided.

What is claimed is:

1. A layered catalytic article comprising:
 a) a first layer comprising platinum, a first platinum group metal component other than platinum, a ceria-alumina component, and an oxygen storage component that is different from the ceria-alumina component; wherein platinum and the first platinum group metal component are separately supported on different supports, platinum is supported on the ceria-alumina component; the first platinum group metal component is chosen from palladium, rhodium and a combination thereof, and the first platinum group metal component is supported on the oxygen storage component,
 b) a second layer comprising a second platinum group metal component; and a refractory alumina component, an oxygen storage component or a combination thereof; wherein the second platinum group component is chosen from platinum, palladium, rhodium, and a combination thereof, and
 c) a substrate,
wherein the amount of platinum ranges from 20 wt. % to 50 wt. %, based on the total weight of platinum, palladium and rhodium.

2. The layered catalytic article according to claim 1, wherein the amount of platinum in the first layer ranges from 50 wt. % to 100 wt. %, based on the total weight of platinum in the catalytic article.

3. The layered catalytic article according to claim 1, wherein the first layer is deposited on the substrate as a bottom layer, the first layer comprises platinum supported on the ceria-alumina component, and palladium supported on ceria-alumina and an oxygen storage component; and the second layer is deposited on the first layer as a top layer, the second layer comprises rhodium supported on the ceria-alumina component, refractory alumina component, oxygen storage component or any combination thereof and optionally, palladium supported on an oxygen storage component.

4. The layered catalytic article according to claim 1, wherein the second layer is deposited on the substrate as a bottom layer, the second layer comprises palladium supported on the oxygen storage component, refractory alumina component or a combination thereof; and the first layer is deposited on the second layer as a top layer, the first layer comprises rhodium supported on the oxygen storage component and platinum supported on a ceria-alumina component.

5. The layered catalytic article according to claim 1, wherein the correlation coefficient between platinum and aluminum in the first layer is greater than 70% measured by EPMA line scan analysis.

6. The layered catalytic article according to claim 1, wherein the ceria-alumina component comprises ceria-alumina, ceria-yttrium-alumina, ceria-silica-alumina, ceria-tin-alumina, ceria-manganese alumina, ceria-iron-alumina, ceria-nickel-alumina, ceria-iridium-alumina, ceria-ruthenium-alumina, ceria-indium-alumina, or ceria-titania.

7. The layered catalytic article according to claim 1, wherein the ceria content of the ceria-alumina component ranges from 1.0 wt. % to 75.0 wt. %, based on the total weight the ceria-alumina component.

8. The layered catalytic article according to claim 1, wherein the ceria content of the ceria-alumina component ranges from 5.0 wt. % to 50.0 wt. %, based on the total weight the ceria-alumina component.

9. The layered catalytic article according to claim 1, wherein the ceria content of the ceria-alumina component ranges from 5.0 wt. % to 30.0 wt. %, based on the total weight the ceria-alumina component.

10. The layered catalytic article according to claim 1, wherein the amount of platinum in the first layer ranges from 0.02 wt. % to 4.0 wt. %, based on the total weight of the catalytic article.

11. The layered catalytic article according to claim 1, wherein the amount of palladium in the catalytic article ranges from 0.02 wt. % to 4.0 wt. %, based on the total weight of the catalytic article.

12. The layered catalytic article according to claim 1, wherein the amount of rhodium in the catalytic article ranges from 0.02 wt. % to 4.0 wt. %, based on the total weight of the catalytic article.

13. The layered catalytic article according to claim 1, wherein the oxygen storage component comprises ceria, zirconia, and a rare earth metal oxide chosen from lanthana, yttria, neodymia, praseodimia, gadolinia, and any combination thereof.

14. The layered catalytic article according to claim 1, wherein the oxygen storage component comprises ceria in an amount ranging from 5.0 wt. % to 50.0 wt. %, based on the total weight of the oxygen storage component.

15. The layered catalytic article according to claim 1, wherein the refractory alumina component comprises alumina, and optionally a dopant chosen from lanthana, ceria, titania, zirconia, hafnia, magnesia, calcia, strontia, baria, and any combination thereof.

16. The layered catalytic article according to claim 1, wherein the second layer is essentially free of platinum.

17. The layered catalytic article according to claim 16, wherein the amount of platinum in the second layer is less than 0.001 wt. %, based on the total weight of palladium and rhodium present in the second layer.

18. The layered catalytic article according to claim 1, wherein the first layer, the second layer or both further comprises barium oxide, strontium oxide, lanthanum oxide or any combination thereof.

19. The layered catalytic article according to claim 1, wherein the substrate is chosen from a ceramic substrate, a metal substrate, a ceramic foam substrate, a polymer foam substrate, and a woven fibre substrate.

20. The layered catalytic article according to claim 1, wherein the platinum is thermally or chemically fixed on the ceria-alumina component.

21. A process for the preparation of a layered catalytic article according to claim 1, wherein the process comprises preparing a first layer slurry; depositing the first layer slurry on a substrate to obtain a bottom layer; preparing a second layer slurry; and depositing the second layer slurry on the bottom layer to obtain a top layer followed by calcination at a temperature ranging from 400° C. to 700° C., wherein the step of preparing the bottom coat slurry or top coat slurry comprises a technique chosen from incipient wetness impregnation, incipient wetness co-impregnation, and post-addition.

22. A process for the preparation of a layered catalytic article according to claim 1, wherein the process comprises preparing a first layer slurry; preparing a second layer slurry; depositing the second layer slurry on a substrate to obtain a bottom layer; and depositing the first layer slurry on the bottom layer to obtain a top layer followed by calcination at a temperature ranging from 400° C. to 700° C., wherein the step of preparing the first layer slurry or second layer slurry comprises a technique chosen from incipient wetness impregnation, incipient wetness co-impregnation, and post-addition.

23. An exhaust system for internal combustion engines, the system comprises the layered catalytic article according to claim 1.

24. The exhaust system according to claim 23, wherein the system comprises a platinum group metal based three-way conversion catalytic article and the layered catalytic article, wherein the platinum group metal based three-way conversion catalytic article is positioned downstream from an internal combustion engine and the layered catalytic article is positioned downstream in fluid communication with the platinum group metal based three-way conversion catalytic article.

25. The exhaust system according to claim 23, wherein the system comprises a platinum group metal based three-way conversion catalytic article and the layered catalytic article, wherein the layered catalytic article is positioned downstream from an internal combustion engine and the platinum group metal based three-way conversion catalytic article is positioned downstream in fluid communication with the three-way conversion catalytic article.

26. A method of treating a gaseous exhaust stream comprising hydrocarbons, carbon monoxide, and nitrogen oxides, the method comprising contacting the exhaust stream with the layered catalytic article according to claim 1.

27. A method of reducing hydrocarbons, carbon monoxide, and nitrogen oxides levels in a gaseous exhaust stream, the method comprising contacting the gaseous exhaust stream with the layered catalytic article according to claim 1 to reduce the levels of hydrocarbons, carbon monoxide, and nitrogen oxides in the exhaust gas.

* * * * *